(12) United States Patent
Cooper

(10) Patent No.: US 6,191,407 B1
(45) Date of Patent: Feb. 20, 2001

(54) APPARATUS AND METHOD FOR SPATIALLY STABILIZING PROJECTED OR VIEWED IMAGES WITH A LOCATING SYMBOL POSITION DETECTION

(76) Inventor: J. Carl Cooper, 15288 Via Pinto, Monte Sereno, CA (US) 95030

(*) Notice: Under 35 U.S.C. 154(b), the term of this patent shall be extended for 0 days.

(21) Appl. No.: 09/204,756

(22) Filed: Dec. 2, 1998

Related U.S. Application Data

(60) Continuation of application No. 09/074,302, filed on May 6, 1998, now Pat. No. 5,949,087, which is a division of application No. 08/775,478, filed on Dec. 30, 1996, now Pat. No. 5,793,053, which is a division of application No. 08/730,768, filed on Oct. 16, 1996, now Pat. No. 5,635,725, which is a continuation of application No. 08/195,422, filed on Feb. 15, 1994, now abandoned.

(51) Int. Cl.$^7$ .................................................. H01L 27/00
(52) U.S. Cl. ............................... 250/208.1; 250/559.29; 359/557
(58) Field of Search .......................... 250/559.29, 208.1, 250/559.3, 559.45; 359/555–557

(56) References Cited

U.S. PATENT DOCUMENTS

| | | |
|---|---|---|
| 3,544,207 | 12/1970 | John, Jr. . |
| 3,753,612 | 8/1973 | Okey . |
| 4,296,438 | 10/1981 | Stemme et al. ....................... 358/214 |
| 5,194,958 | 3/1993 | Pearman et al. ..................... 358/214 |
| 5,544,140 | 8/1996 | Seagrave et al. ....................... 369/59 |
| 5,581,404 * | 12/1996 | Misaka et al. ....................... 359/557 |
| 5,635,725 * | 6/1997 | Cooper ............................ 250/559.29 |
| 5,793,053 * | 8/1998 | Cooper ............................ 250/559.29 |

* cited by examiner

*Primary Examiner*—Que T. Le
(74) *Attorney, Agent, or Firm*—J. Carl Cooper

(57) ABSTRACT

The present disclosure teaches a method and apparatus for use in stabilizing images. The invention operates to sense the position of a locating symbol having a known relationship to the image to be stabilized, compare the position of the locating symbol to a reference to determine a displacement value responsive thereto and changing a correction element located in the conveyance path of the image in response to the displacement value to cause a compensating displacement of the image. The invention is particularly useful in reducing gate weave in film projectors.

12 Claims, 1 Drawing Sheet

APPARATUS AND METHOD FOR SPATIALLY STABILIZING PROJECTED OR VIEWED IMAGES WITH A LOCATING SYMBOL POSITION DETECTION

This application is a Continuation in Part of application Ser. No. 09/074,302 filed May 6, 1998 now U.S. Pat. No. 5,949,087 which is a division of 08/775,478 filed Dec. 30, 1996 now U.S. Pat. No. 5,793,053 which is a division of 08/730,768 filed Oct. 16, 1996 now U.S. Pat. No. 5,635,725 which is a continuation of 08/195,422 filed Feb. 15, 1994, abandoned, which application is incorporated herein as fully and for all purposes as may be permitted by law as if it had been set forth in detail in the present specification.

BACKGROUND OF THE INVENTION

1. Field of the Invention

This invention relates to the field of spatially stabilizing projected or viewed images which are projected or created from a film or other image bearing source onto a projection screen or suitable location wherein the image appearing thereat is subject to movement such as weaving or jitter resulting from imperfections in the projection system or image bearing source. The invention finds particular use for stabilizing projected optical images from film and television projectors, graphics printers or images photographed by a camera such as a still video or television camera.

In the presentation, viewing or capture of images, problems often occur which cause movement, jitter and/or distortion of the image. Electro mechanical and optical mechanical devices such as projectors and cameras are highly susceptible to such problems.

One of the most common of mechanical effects occurs with film projectors and is called gate weave in the motion picture industry. Gate weave results in a moving and jittery image being presented on the motion picture screen when the movie is projected due to slight movement of the projected film image. The main cause of gate weave in this instance is the improper positioning of the film image in the film gate or aperture of the projector from one frame to the next due to uneven wearing of the sprocket holes in the film occurring over prolonged use. The sprocket holes are used by the projector intermittent gear to position the film in the projector aperture for the momentary presentation of each frame, with the edges of the holes requiring critical alignment with respect to the film image. As the film is projected over and over, these edges tend to wear unevenly.

The parent application of this specification deals with an invention which can effectively correct the above problems. The present specification deals with an improvement to the previous invention which utilizes specific features of the image bearing medium in order to provide lower cost and/or higher performance corrections. In particular, the preferred embodiment of the invention finds considerable use with motion picture film which includes digital audio tracks.

2. Description of the Prior Art

In the Prior art it is known to apply considerable mechanical precision to the movement and holding of the image bearing or image receiving element of imaging systems. In particular film projectors having elaborately designed film movement and positioning mechanics are well known. In the field of acquiring images, such as in film and television cameras, elaborate types of vibration and movement damping mechanisms are used, these including electromechanical gyroscope mechanisms to hold the camera or its mounting platform steady.

It is also known in the television industry to electronically correct a jittering television image by the electronic process of moving the video image signal with respect to its horizontal and vertical synchronizing pulses with the aid of complex motion detection circuits and frame memory control. Such systems do not lend themselves to improvement of existing projection and camera equipment and in particular to the improvement of existing motion picture film and television projectors.

OBJECTS OF THE INVENTION

It is an object of the present invention to provide improved performance with respect to the various objects of the parent specification.

It is an object of the invention to stabilize an image by sensing the position of a known feature of the image bearing source with respect to a reference and altering the conveyance path of the image in response thereto in order to improve the stability of the image.

It is another object of the invention to position an electromagnetic radiation image by sensing a feature on the image bearing source and altering the path of the electromagnetic radiation which creates the image in the first or a second form in order to improve the positional accuracy of the image.

It is a yet another object of the invention to stabilize an optical image by sensing the position of the image conveying medium and refracting the light which creates the image from the medium to another location in response thereto in order to improve the stability of the image.

It is still another object of the invention to sense a feature of the medium carrying an optical image to be stabilized, compare the position of the feature from one moment in time to another to determine a displacement value responsive to the displacement thereof in at least one dimension and changing an optical correction element located in the light path of the image in response to the displacement value to cause a compensating displacement of the image.

It is a further object of the invention to sense, before or during projection, the position of a series of projected features related to image frames to be stabilized during projection, compare the position of the feature corresponding to one frame to the image relative to the feature corresponding to another frame to determine a displacement value responsive to the displacement thereof and changing an optical correction element located in the light path of the projected image in response to the displacement value to cause a compensating displacement of the projected image.

It is yet a further object of the invention to sense the position of a non image feature corresponding to an image frame of motion picture film which is to be projected, compare the position of the feature relative to a desired position, and changing a correction element located in the projection path of the image in response to the position of the feature.

It is still a further object of the invention to sensing the position of a digital data portion of a motion picture film relative to a desired position and to modulate the position of the projected image from a frame of the film which has a known spatial relationship to the digital data portion in response to the position sensing in order to correct the projection of the image from the film frame.

It is further another object of the invention to use a position measure responsive to a known pattern located in digital sound data of a motion picture film to modify the projection of a film image from a film frame having a known spatial relationship to the sound data in order to position the projected image such as to reduce positional errors.

Other objects and a fuller understanding of the invention may be had by referring to the following description and claims, taken in conjunction with the accompanying drawings, in which:

DESCRIPTION OF THE PREFERRED EMBODIMENT

Figure 1:
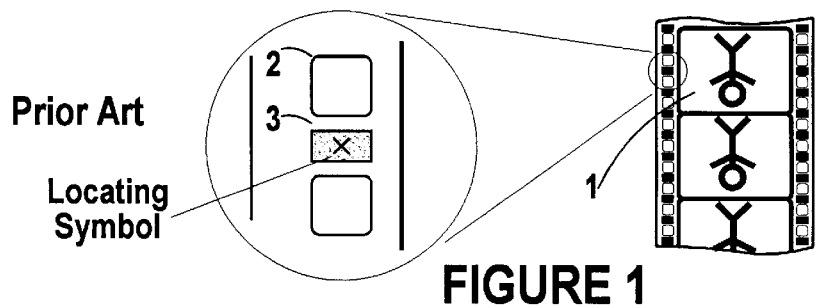
FIG. 1 shows a diagram of the known prior art digital sound data located between sprocket holes in motion picture film.

FIG. 1, shows by way of example a prior art section of motion picture film, including a film frame carrying the image 1, a sprocket hole 2 and a digital data section carrying digital sound information 3 all as well known in the art. It will be noted that the optical sound track which is conventionally present in films is not shown for clarity. The digital data 3 conventionally carries digitized sound which is associated with the image. While FIG. 1 shows a digital sound section between each sprocket hole on both sides of the film, it will be recognized that numerous variations in the structure, format and location of the digital sound data exists in various different competing digital sound systems and this particular drawing is given by way of example.

In particular, attention is drawn to the middle section of the digital data having a known and constant pattern, which in the present drawing is shown as a locating symbol X. While motion picture film is shown by way of example, one of ordinary skill in the art will recognize from the teachings herein that the description given, and the inventive concepts disclosed, will apply to any image carrying or displaying medium which contains a known pattern which bears a known relationship to the image or the image frame as described hereafter.

It is well known in the art to sense the digital sound data with an optical sensor such as a television camera like CCD sensor in order that each block of data may be recovered and used to reconstruct digital sound tracks relating to the film images. Such a system for example is manufactured and licensed by Dolby Laboratories of San Francisco, Calif. Several other systems, which because of desirable characteristics may be utilized with the present invention will become known to one of ordinary skill in the art from the teachings herein.

In particular, the system depicted by way of example in FIG. 1 has the previously mentioned known repeated pattern represented by X which is used by the prior art digital sound data recovery system. Pattern X enables the system to precisely and accurately locate the optically sensed digital data area for data recovery despite the position of the data area moving about due to gate weave type problems which cause the location of the digital data to move relative to the sensor as the sensor reads new patterns in a continuing manner. Such systems may be readily modified to provide displacement information indicating the displacement of the known pattern X from a reference position, as described in detail in the parent application.

It is important to recognize for the purposes of the present invention that the known and repetitive pattern is a constant pattern while the digital data in the data area is a changing pattern which changes according to the audio program represented thereby. It may be further noted that prior art devices for reading the digital data incorporate necessary means to enable the location of such pattern and as described in the parent application may be easily modified to provide a measure of the pattern displacement relative to a known reference position (which may be changed from time to time or continuously) as part of recovering the digital data. Additionally, the pattern represented by X has a known relationship to the image 1 thus the recovery and/or determination of the position of X relative to the reference is directly related to the position of the image 1.

For purposes of the disclosure and claims herein, the term locating symbol will be used to refer to and include any known mark, pattern, symbol or other feature which is not part of the image (but may be located in the image) which has the characteristic of having a known positional relation to the image which relation is relatively stable over time and usage, and which may be positionally sensed to thereby provide a direct or indirect indication of the position of the image. Examples of locating symbols include electrical, mechanical or optical marks or patterns such as the herein described X, frame boundaries of the image frames, patterns present in digital data, or other recognizable symbols which remain reasonably constant while the image changes and for which the relationship to the image does not wear down over time or use as for example sprocket holes do. The number of locating symbols relative to the image frames is preferred to be at least four symbols per frame, but may be more or less. The number of or spatial relationship, of locating symbols to image frames may vary within a given program being presented as long as the relationship between the locating symbol and the image (or image frame) is known so as to determine a deviation from a desired position.

For example, in a film projector the film may switch from a first digital sound system with a first type of locating symbol to a second digital sound system with a second type of locating symbol and as long as the relationship between the respective locating symbol and image is known the present invention may be utilized.

It should be noted that while X is shown by way of example as being located between the sprocket holes, for purposes of the present inventive disclosure it will be understood that the locating symbol may be located anywhere on or in the image medium, within or outside of the image frame, front side, back side or internal to the medium, so long as information of the symbol's position may be recovered.

In film mediums the locating symbol may be upstream, downstream or colocated with a particular associated frame. As just one example, digital sound data is usually recorded on the emulsion side of the film and positioned several frames upstream of the particular image frame with which the sound is associated. The upstream positioning allows the digital data to be recorded in the image emulsion layer and is located far enough upstream to allow for processing delays in the recovery of the digital sound so that the digital sound will be available at the instant the image frame is being projected. It will also be recognized that existing means are available to recognize the position of such locating symbols, for example such as in above described digital sound systems.

Figure 2:
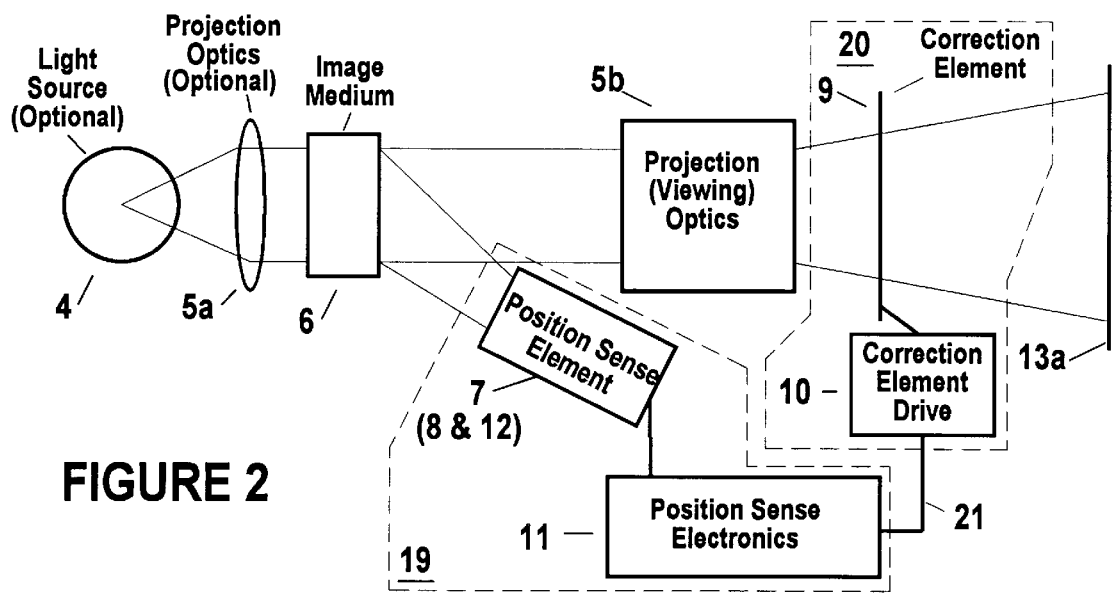
FIG. 2 shows a diagram of the preferred embodiment of the invention as used with a generalized image medium.

FIG. 2 shows a side view block diagram of an embodiment of the invention having an image bearing medium 6 which carries or presents the visual image and the locating symbol, an optional light source 4 providing illumination for the image if needed, projection optics 5a and 5b facilitating the coupling of illumination from 4 through or to 6 if needed and coupling the illuminated or luminous image from 6 via the correction element 9 to the screen or viewing area 13a. Elements 4, 5a, 5b, 6 and 13a are all well known in the art and may be arranged in and take on a variety of forms and configurations. In particular, while the image medium 6 is shown in transmissive form, passing light from 4 to 13a, it will be understood that it may also operate in a reflective mode or in a light emanating mode without the need for a separate light source 4 and optics 5. By way of example, various technologies which may be utilized for 6 include, but are not limited to: LED, LCD, film, micro mirror, CRT, various flat panel technologies such as vacuum fluorescent or various laser projection technologies such as copiers and printers.

It will be recognized from the present teachings that the image position (before or after correction) may be sensed via use of the locating symbol, and the image conveyance path may be altered by the correction element 9 in order to correct the image location at a projected or viewed position, thus the present invention may be utilized with many image display and presentation technologies. Accordingly, it will be realized from the teachings herein that the present invention may be utilized with a number of different image devices and the particular arrangement and selection of such elements may be made according to the needs satisfied by the particular technology, the use of the present invention improving such use.

FIG. 2 also includes a position sense section 19 for locating the position of the locating symbol relative to a reference and providing one or more displacement signals 21 indicating the displacement of the locating symbol (and thus the image) relative to a desired location, and a correction section 20 responsive to the displacement signal(s) and operating to provide a correcting movement of the position of the image by altering the light path conveying the image.

The position sense section 19 includes components 7 and 11 for sensing the position of the locating symbol and providing the displacement signal 21. The correction section 20 is responsive to the displacement signal 21 and includes elements 9 and 10. The position sense element 7 optionally includes elements 8 & 12 corresponding to elements 7, 8 and 12 of the parent application (but which may have changes as described herein), for sensing the position of the image via utilization of the locating symbol, position sense electronics 11 corresponding to 11 of the parent application (but which may have changes as described herein) which is coupled to 7 (& 12) to receive the sensed image information from 7 and with 11 further coupled to correction element drive 10 corresponding to 10 of the parent application and correction element(s) 9 corresponding to 9 of the parent application. The description of corresponding elements of the parent application may be resorted to for a detailed description of the preferred embodiment thereof, however it will be understood that in the present specification and claims the position sense section may be any device which is suitable for sensing the aforementioned locating symbol as described herein and providing suitable displacement signal(s) 21 to the correction section 20 in order to cause the correction element 9 to provide correction to the image path thereby causing the image which is projected on or viewed at 13a to be corrected. It is envisioned that many devices which may provide such position sense sections will become available in the future and may be adapted for such use as hereinafter claimed, in particular as development of digital sound technology progresses.

In view of the current use of prior art locating symbols along with circuitry to locate the position of the locating symbol, minor changes may be made to these prior art devices to provide location of the position of the locating symbol relative to a reference as part of the recovery of digital audio data, and one of ordinary skill in the art will recognize that these prior art components may be utilized for significant portions of the elements 7 and 11 of FIG. 2 and the invention may be implemented by resorting to such elements and adding only the necessary additional circuitry to couple that circuitry to 10. Such utilization of existing circuitry will provide a cost effective implementation of the present invention with a minimum of additional elements.

Figure 3:
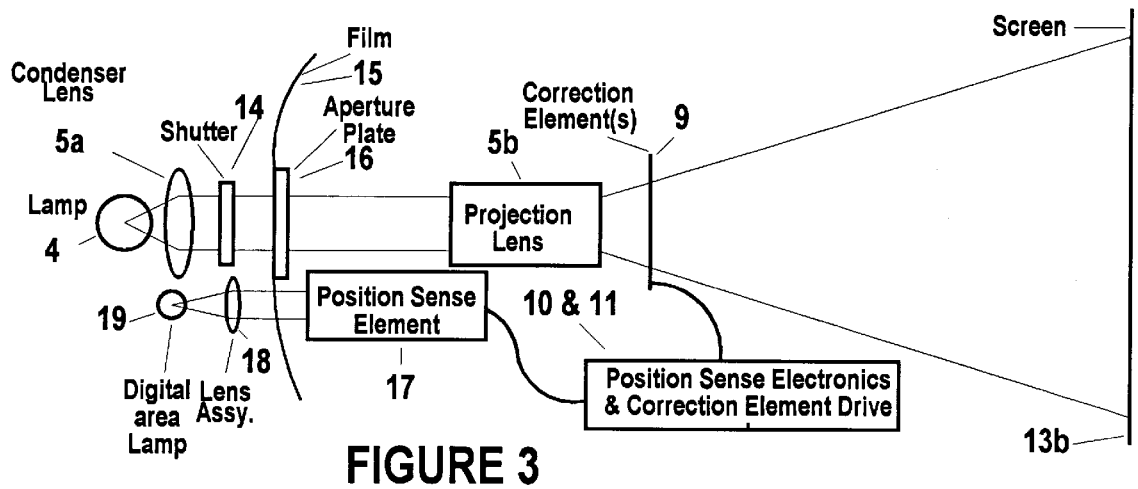
FIG. 3 shows a diagram of the preferred embodiment of the invention as used with a film projector.

FIG. 3 shows a side view diagram of the preferred embodiment of the invention as used with a theater motion picture projector. FIG. 3 shows a lamp 4 and condenser lens 5a which focus light within the film aperture located in the aperture plate 16. The illuminated film frame is focused on a projection screen 1 by a projection lens 5b. Also shown is a shutter 14 which operates to block the light from the lamp 4 whenever the film 15 is being moved from one frame to the next thereby preventing blurring of the image at 13b.

FIG. 3 further includes a digital area lamp 19 and cooperating lens assembly 18 (which may include or be replaced by fiber optics) operating to illuminate the digital data area (3 of FIG. 1) located between sprocket holes. The illuminated digital data area is sensed by position sensing element 17 which in this embodiment includes a lens (8 of the parent application) and CCD image sensor (7 of the parent application). The electronic version of the image from the CCD sensor is coupled to the position sense electronics and correction element drive 10 & 11 which in turn operate to drive correction element 9 to correct the image position on the screen 13b. The position sense section 19 would include 17 and 11, and the correction section 20 would include 9 and 10 as in FIG. 2. The marking of 19 and 20 in FIG. 3 is not shown for simplicity and clarity.

In the embodiment of FIG. 3, the position sense element 17 and a significant portion of the position sense electronics 11 are implemented in the elements utilized to recover the digital data from the film. The illumination elements 18 and 19, the CCD sensor and associated lens and electronics, as well as the circuitry to locate the locating symbol X and modified circuitry to determine its deviation with respect to a known reference are all included in the prior art circuitry (as modified) for recovering the digital data. The present invention may be practiced by coupling the signals representing the deviation of the locating symbol X to translating circuitry (as part of 11) to translate this data to suitable displacement signals 21, which in this embodiment are preferred to correspond to the H motion and V motion signals as shown in FIG. 2 of the parent application. The H motion and V motion signals are then coupled to the correction element drive 10 corresponding to the same numbered element of the parent application. Thus in order to implement the invention with an existing digital sound film projector, all that is required is the modification of existing circuitry and, if necessary, translation circuit for 11 and elements 10 and 9 as described in the parent application. The other circuitry of 11, as well as the circuitry of 7 and 12 of the parent application are cost effectively provided by existing digital sound data circuitry of the projector.

It may be noted that in many prior art digital sound systems, the position sense element 17 is located considerably ahead of the aperture plate 16, rather than immediately adjacent as shown in FIG. 3. The film typically moves past 17 at a constant rate, being positioned by sprocket teeth which engage the sprocket holes very near the locating symbol. The film moves in the aperture at an intermittent rate, again being positioned by an intermittent claw which utilizes the same or nearby sprocket holes. The film is mechanically stable over this distance, i.e. the film does not stretch or shrink from the time a particular locating symbol X travels from where it is sensed by 17 to the aperture in aperture plate 16. The positioning of the film at the sense position of 17, despite being continuous, is performed via the same or nearby sprocket holes in the film as is the positioning at the film aperture. Consequently, considerable correction, especially in the vertical direction, may be achieved. This is important to recognize since the major component in gate weave of many films is vertical movement due to uneven sprocket hole wear. In other words, the sprocket hole wear will cause substantially the same vertical position error at the upstream location of 17 as it will at the aperture plate 16. Measuring the error present at 17 gives a good value for correction at 16 despite there being two sets of sprocket fingers involved.

By incorporating a delay or storage in 11 to compensate for the time it takes for the sensed locating symbol X to travel from 17 to the aperture plate 16, a worthwhile improvement in gate weave can be achieved. The delay or storage may operate with any of the signals which convey the position information, for example the signal(s) out of 17 or the signal(s) out of 11, or even the signal(s) out of 10. The proper construction and operation the storage or delay will be readily apparent to one of ordinary skill in the art from the teachings herein. Thus it will be recognized that a considerable improvement of the stability of the projected image may be had by utilizing the existing digital sound data reading elements and circuitry to provide (via the locating symbol) the image position variation information for the present invention's position sense electronics.

It should also be noted that typically there is less horizontal than vertical correlation between the aperture plate 16 and the position of the locating symbol when it is sensed by 17 which is located well ahead of the aperture. The lack of horizontal correlation is largely due to the film moving sideways at the sense location with relative ease compared to the rigidly held horizontal position at the aperture plate. If it is desired to improve the horizontal correction ability of the invention which can be accomplished by locating 17, 18 and 19 so as to utilize a locating symbol which is located closer to the film aperture. It is desirable to use a locating symbol as close to the aperture as possible, and if colocation can not be achieved due to interference from other projector parts, then location as close as possible but in advance of the aperture, coupled with a delay as described previously is preferred to locating after the aperture. It will be recognized that while moving the location of 17 closer to the aperture the ability to recover digital sound data early enough to provide sound synchronized with the image, it will nevertheless be possible to utilize the same digital sound system components as previously described.

Although the description of the preferred embodiment of the invention is made herein with a certain degree of particularity, it is understood that the present disclosure of the preferred form has been made only by way of example and that numerous changes in the details of construction and the combination and arrangement of parts may be resorted to, as well as tailoring the invention for specific cost, performance and desirable features alone or as part of other apparatus or methods having goals of particular uses without departing from the spirit and the scope of the invention as hereinafter claimed.

What is claimed is:

1. Apparatus for stabilizing an image including in combination:
   a) a position sense section responsive to a locating symbol having a known spatial relationship to said image to sense the position thereof, and;
   b) a correction section responsive to said position sense section and operable to alter the position of said image in order to improve the stability of said image.

2. Apparatus for reducing unwanted movement of an image carried by a medium and conveyed by light from said medium to a viewing location said medium including a locating symbol having a known spatial relationship to said image, said apparatus including in combination:
   a) a position sense section for sensing the position of said locating symbol relative to a known position, and;
   b) a correction section for altering the path of said light which conveys said image in order to reduce movement of said image.

3. An improvement for a film projector for reducing gate weave in the projected image wherein the film carrying said image includes at least one locating symbol having a known position with respect to each frame of said image including in combination:
   a) a position sensing section responsive to said locating symbol to determine the position thereof with respect to a known reference and to provide at least one displacement signal indicating said position, and;
   b) a correction section coupled to said position circuitry and operating to refract light conveying said image in response thereto in order to improve the spatial stability of said image.

4. Apparatus as claimed in claim 1, 2 or 3 wherein said locating symbol of a) is used by a sound recovering device to assist in properly locating the position of digital data conveying said sound.

5. Apparatus as claimed in claim 1, 2 or 3 wherein said locating symbol of a) is used by a sound recovering device to assist in properly locating the position of digital data conveying said sound and circuitry which provides section a) is shared with said sound recovering device.

6. Apparatus as claimed in claim 1, 2 or 3 wherein said correction section b) includes at least one flat optical element through which light conveying said image is passed, with movement of said image being accomplished by tilting said flat optical element relative to the path of said light.

7. A method for stabilizing an image including the steps of:
   a) sensing a locating symbol having a known spatial relationship to said image to sense the position thereof, and;
   b) altering the position of said image in response to said position thereby improving the stability of said image.

8. A method for reducing unwanted movement of an image carried by a medium and conveyed by light from said medium to a viewing location said medium including a locating symbol having a known spatial relationship to said image, said method including the steps of:
   a) sensing the position of said locating symbol relative to a known position, and;
   b) in response to step a) altering the path of said light which conveys said image in order to reduce movement of said image.

9. A method of reducing gate weave in the projected image of a film projection wherein the film carrying said image includes at least one locating symbol having a known position with respect to each frame of said image including the steps of:

a) sensing the position of said locating symbol relative to a known reference to determine the position thereof and to provide at least one displacement measure indicating said position, and;

b) in response to said displacement measure of step a) refracting the light conveying said image in thereby improving the spatial stability of said image.

10. The method as claimed in claim 7, 8 or 9 wherein said locating symbol of step a) is used by a sound recovering step to assist in properly locating the position of digital data conveying said sound.

11. The method as claimed in claim 7, 8 or 9 wherein said locating symbol of step a) is used by a sound recovering step to assist in properly locating the position of digital data conveying said sound and step a) is shared with said sound recovering step.

12. The method as claimed in claim 7, 8 or 9 wherein said step b) includes passing light conveying said image through at least one flat optical element and moving said image by tilting said flat optical element relative to the path of said light.

* * * * *